US008695090B2

(12) United States Patent
Barile et al.

(10) Patent No.: US 8,695,090 B2
(45) Date of Patent: Apr. 8, 2014

(54) DATA LOSS PROTECTION THROUGH APPLICATION DATA ACCESS CLASSIFICATION

(75) Inventors: Ian Barile, Mountain View, CA (US); Bruce Wootton, Alameda, CA (US); Dirk Kessler, San Francisco, CA (US); Rajesh Upadhyay, Newark, CA (US)

(73) Assignee: Symantec Corporation, Mountain View, CA (US)

( * ) Notice: Subject to any disclaimer, the term of this patent is extended or adjusted under 35 U.S.C. 154(b) by 526 days.

(21) Appl. No.: 12/263,319

(22) Filed: Oct. 31, 2008

(65) Prior Publication Data

US 2010/0115614 A1    May 6, 2010

(51) Int. Cl.
G06F 11/00 (2006.01)
G06F 12/14 (2006.01)
G06F 12/16 (2006.01)
G08B 23/00 (2006.01)

(52) U.S. Cl.
USPC .......................................................... 726/22

(58) Field of Classification Search
USPC .......................................................... 726/22
See application file for complete search history.

(56) References Cited

U.S. PATENT DOCUMENTS 6,839,850 B1 * 1/2005 Campbell et al. ............... 726/23
7,774,363 B2 * 8/2010 Lim .............................. 707/781
7,783,666 B1 * 8/2010 Zhuge et al. .................. 707/783
2006/0271596 A1 * 11/2006 Sabsevitz et al. ............. 707/200
2007/0083928 A1 4/2007 Mattsson et al.

FOREIGN PATENT DOCUMENTS

| GB | 2411988 A | 9/2005 |
| WO | WO2007/034157 A1 | 3/2007 |
| WO | WO2008/075442 A1 | 6/2008 |
| WO | WO2008/109106 A1 | 9/2008 |

OTHER PUBLICATIONS

B. Carrier, File System Forensic Analysis, Addison-Wesley Professional, Mar. 2005, 4 pages.*
A. Baker, The Windows 2000 Device Driver Handbook, Prentice Hall, 2001, 3 pages.*
UK Intellectual Property Search Report, Feb. 18, 2010, 1 page.

* cited by examiner

*Primary Examiner* — Carl Colin
*Assistant Examiner* — John Elmore
(74) *Attorney, Agent, or Firm* — Lowenstein Sandler LLP

(57) ABSTRACT

A method and apparatus for classifying behavior of an application based on its data access pattern is described. In one embodiment, the method includes monitoring file access events associated with an application, and determining whether at least one of the file access events indicates the application's attempt to manipulate data of a file. If at least one file access event indicates the application's attempt to manipulate the data within the file, then at least one action is caused to be performed.

18 Claims, 6 Drawing Sheets

DATA LOSS PROTECTION THROUGH APPLICATION DATA ACCESS CLASSIFICATION

FIELD OF INVENTION

Embodiments of the invention relate to the field of processing data, and more particularly, to classifying behavior of an application based on its data access pattern.

BACKGROUND OF THE INVENTION

Employees of a modern organization often have access to files including information concerning various significant business aspects of the organization. This information may include data on customers (or patients), contracts, deliveries, supplies, employees, manufacturing, or the like. Existing security techniques typically scan data as it is leaving an endpoint system to prevent loss of sensitive information. The above scanning relies on the ability of the endpoint system to intercept and parse data being output from a program. In some cases, however, the format of data intercepted by the endpoint system may not be known or a program may encrypt the data prior to outputting it. In addition, the endpoint system may not always be able to intercept data being output by a program.

An endpoint system may address the above limitations by preventing certain applications from accessing files that contain confidential information. For example, an endpoint system may block access to files containing confidential information by such applications as CD or DVD burning applications, compression or fingerprinting applications, etc. However, blocking of application file access incurs a false positive penalty. In particular, an application does not always access a file with intent to manipulate the file's data. Instead, an application may merely scan the metadata of a file, without opening the file for viewing or editing (e.g., to determine the file's properties for directory presentation reasons, etc.).

SUMMARY OF THE INVENTION

A method and apparatus for classifying behavior of an application based on its data access pattern is described. In one embodiment, the method includes monitoring file access events associated with an application, and determining whether at least one of the file access events indicates the application's attempt to manipulate data of a file. If at least one file access event indicates the application's attempt to manipulate the data within the file, then at least one action is caused to be performed.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
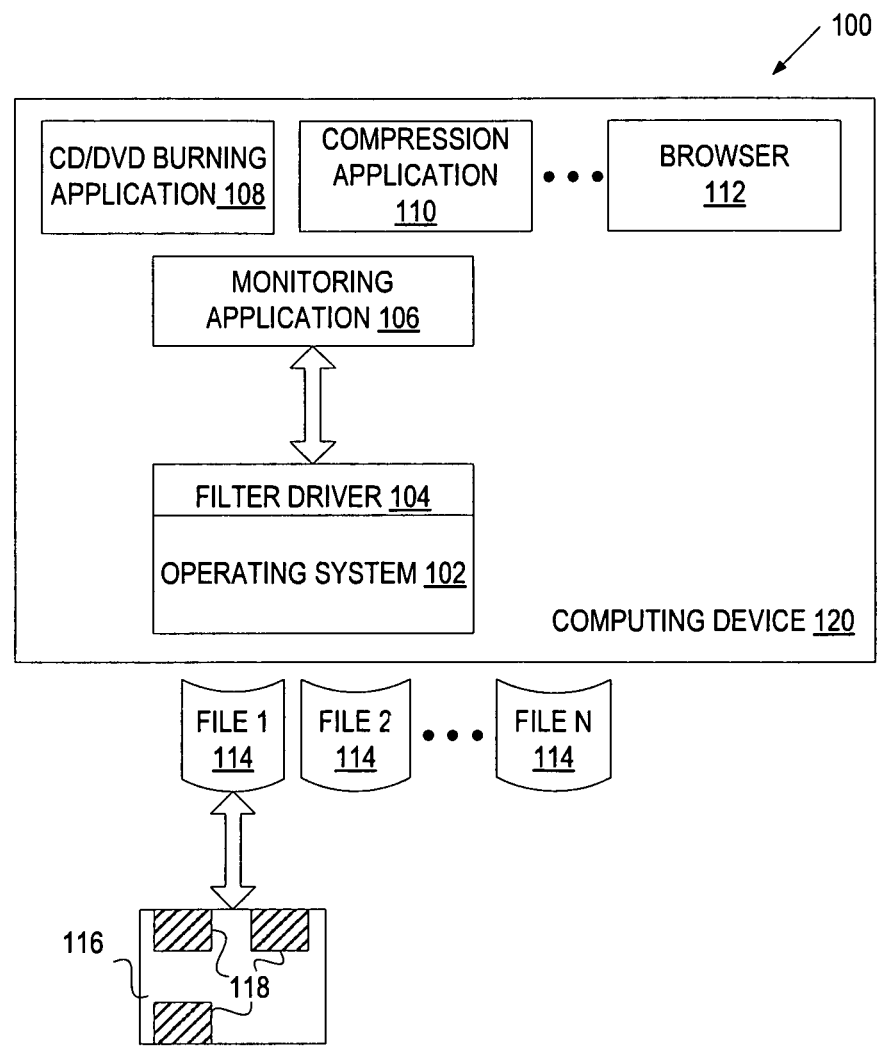
FIG. 1 illustrates exemplary system architecture in which embodiments of the invention may operate.

A system and method for classifying behavior of an application based on its data access pattern is described. An application may be, for example, a CD burning application, a DVD burning application, a compression application (e.g., zip compression), a browser (e.g., Internet Explorer®), a cloud storage application (e.g., Live Mesh service), etc. In one embodiment, file access events associated with an application are monitored to determine whether at least one of these file access events indicates the application's attempt to manipulate data of the file. The determination may be based, for example, on read block sizes of the file access events, read offsets of the file access events, the number of file access events over a specific time interval, or any combination of the above factors. The file data manipulation, as opposed to metadata manipulation, may involve, for example, editing file data, transforming file data, writing file data to a removable storage medium, etc.

If at least one file access event indicates the application's attempt to manipulate the file data, an action associated with such manipulation is triggered. An exemplary action being triggered may involve scanning the file data for confidential information, and upon detecting confidential information, blocking the access to the file data by the application and/or reporting the application's access of the file data. Otherwise, if the file access events indicate the application's attempt to scan the file's metadata, as opposed to the file data, the file access events are ignored.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "calculating", "determining", "displaying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary system architecture 100 in which embodiments of the invention may operate. The system 100 includes a computing device 120 that may be a personal computer (PC), a laptop, a mobile phone, a server, or any other computing device. The computing device 120 runs an operating system (OS) 102 that manages hardware and software of the computing device 102. The OS 102 may be, for example, Microsoft® Windows® OS, Linux, Mac OS, Solaris, etc. Applications 108, 110 and 112 run on top of the OS 102 and perform various functionalities that involve accessing files 114 residing in data storage (e.g., memory or disk drive) of the computing device 120. For example, the applications 108 through 112 may include a CD or DVD burning application 108, a compression application 110, a web browser 112, etc.

A file 114 may include metadata 118 (known as metainfo) and the actual data 116 (the remaining part of the file). The metainfo 118 may specify various file properties such as format, title, size, date of creation, date of last update, etc. The applications 108 through 112 may scan the file metainfo, without accessing the actual data of the file (e.g., to display a file directory, to determine whether hardware of the computing device 210 is capable of displaying a certain video file, etc.). Alternatively, the applications 108 through 112 may read the actual data of the file to edit the data, encrypt the data, write the data to a removable storage medium, etc. In certain situations, it is important to distinguish the application's manipulation of the file data from scanning of the file metainfo. For example, a data loss prevention (DLP) system may need to prevent the CD or DVD burning application 108 from writing the file data containing confidential information to a removable storage medium, while allowing the application 108 to scan the file metainfo for presenting a file directory. Similarly, a DLP system may need to prevent the browser 112 from opening the image file for editing, while allowing the browser 112 to scan the file's metainfo to determine whether the hardware of the computing device 120 is capable of displaying the image data.

In one embodiment, the computing device 120 hosts a monitoring application 106 that monitors file access events associated with the applications 108 through 112 ("suspicious" applications) to determine whether these suspicious applications attempt to access the file data or the file metainfo. In particular, the monitoring application 106 may communicate with a filter driver 104 to detect the execution of the suspicious applications and to receive file access events associated with the suspicious applications. In one embodiment, the filter driver 104 acts as part of the OS 102 to be able to determine which applications start executing (e.g., by intercepting OS calls for process creation) and to see I/O requests of executing applications (e.g., using file system hooks to see all file I/O on the system and to receive I/O request packets (IRPs)). The filter driver 104 can then send file access events associated with the suspicious applications 108 through 112 to the monitoring application 106. A file access event may include, for example, information identifying the file being accessed, the application accessing the file, the read block size and/or read offset requested by the application, etc.

Upon receiving a file access request, the monitoring application 106 may analyze the event to determine whether it follows a metainfo read pattern or a file data read pattern. In one embodiment, the monitoring application 106 performs this analysis using a threshold read block size. If the read block size in the received file access event exceeds the threshold parameter, the monitoring application 106 determines that the received file access event follows a file data read pattern. Otherwise, if the read block size in the received file access event is below the threshold parameter, the monitoring application 106 determines that the received file access event follows a metainfo read pattern. In one embodiment, the monitoring application 106 can also compare a read offset from the received file access event with one or more predetermined offset parameters to verify the access pattern of the suspicious application. The threshold read block size and predetermined read offset parameters can be the same for all suspicious applications or be application specific. The threshold read block size and predetermined read offset parameters can be derived based on knowledge of popular system libraries or be determined empirically by observing the behavior of individual applications. For example, in order to display the open file dialog box and allow a user to view properties of listed files, the CD/DVD burning application 108 has to read a designated DLL (dynamically linked library) of Windows OS using block reads at 2-64 bytes, 256 bytes and 512 bytes. However, when the CD/DVD burning application 108 writes file data to a removable storage medium, it reads data in block sizes of 4096 bytes or larger. In another example, a web browser may need to read metainfo of an avi file to determine whether the hardware of the computing device 120 is capable of displaying the avi file. Avi metainfo is stored at an offset of 32 bytes from the head of the file and is 52 bytes in size. In this case, the web browser will use the block size of 52 bytes and the offset of 52 bytes. Alternatively, if the web browser attempts to open the avi file for viewing and editing, it will read data in block sizes of 4096 bytes.

In one embodiment, the monitoring application 106 also tracks the number of file access events of a suspicious application over a time interval. If this number exceeds a threshold (i.e., the suspicious application generates frequent file access requests), the monitoring application 106 decides that the suspicious application attempts to manipulate the data of the file. The threshold read number can be determined empirically based on the behavior of individual applications and may be the same for all applications or different for at least some of the applications.

If the monitoring application 106 determines that the file access event associated with a suspicious application follows a metainfo read pattern, the monitoring application 106 ignores this file access event. Alternatively, if the monitoring application 106 determines that a suspicious application attempts to manipulate the file data, it triggers one or more actions that may prevent or restrict this attempt of the suspicious application. For example, the monitoring application 106 may cause the file to be scanned for confidential information, and if the scan detects confidential information, the access of the suspicious application to the file may be blocked or reported. These actions can be performed by the monitoring application 106 itself or by a DLP application communicating with the monitoring application 106 and hosted by the computing device 120 or another computing device that is coupled to the device 120 via a network (e.g., LAN or Internet).

In another embodiment, the monitoring application 106 first determines which files contain confidential information, and then monitors and analyzes only application accesses of the files that contain confidential information. If the monitoring application 106 determines that a suspicious application attempts to merely scan metinfo of a file containing confidential information, the monitoring application 106 allows the scanning to proceed. Alternatively, if the monitoring application 106 determines that the suspicious application attempts to read the file data, then the monitoring application 106 triggers an action that may prevent, restrict or report this attempt of the suspicious application.

Figure 2:
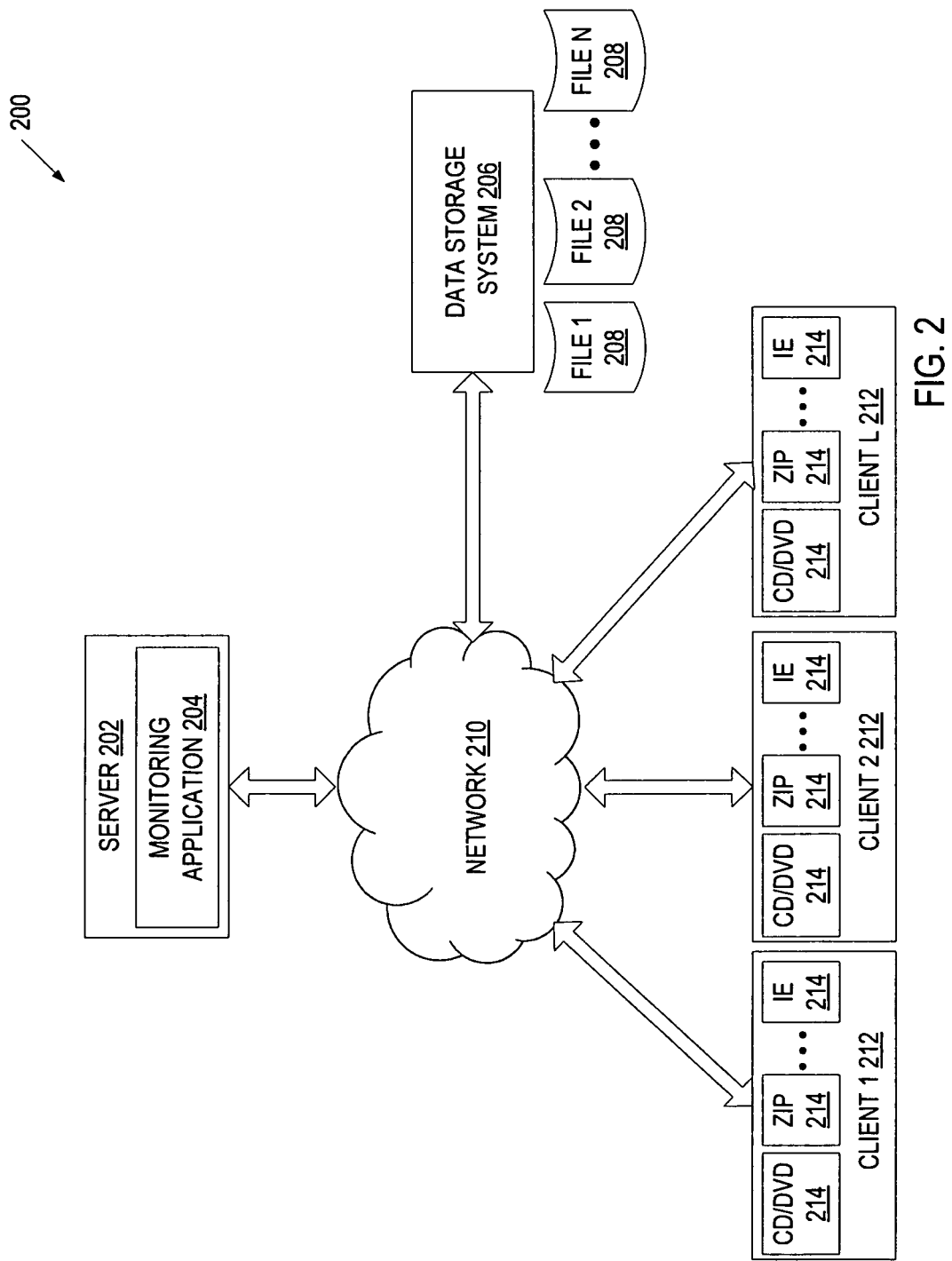
FIGS. 2 and 3 illustrate exemplary network architectures in which embodiments of the invention may operate.

FIG. 2 illustrates exemplary network architecture 200 in which embodiments of the invention may operate. According to network architecture 200, clients 212 are coupled to a data storage system 206 via a network 210 (e.g., a private network such as LAN or a public network such as Internet). Each client 212 may be a PC, a laptop, a mobile phone, a personal digital assistant, etc. The data storage system 206 may represent, for example, a network attached storage (NAS) system that stores various files 208.

Each client 212 hosts applications 214 that perform various functionality such as CD/DVD burning, zip compression, web browsing, etc. Each of these suspicious applications 214 can access files 208 residing in the data storage system 206. As discussed above, the suspicious applications 214 may simply scan metainfo of files 208 or access the actual file data. Monitoring application 204 functions similarly to the monitoring application 106 to classify behavior of a suspicious application 204 based on its data access pattern. In one embodiment, the monitoring application 204 resides in a server 204 coupled to the clients 212 via the network 210, and receives file access events associated with the suspicious applications 214 from a network-based application that sniffs network traffic between the clients 212 and the data storage system 206, or from an application hosted by the data storage system 206. In another embodiment, the monitoring application 204 may be hosted by the data storage system 206 and may intercept the file access requests of the applications 214 when they are received by the data storage system 206.

Figure 3:
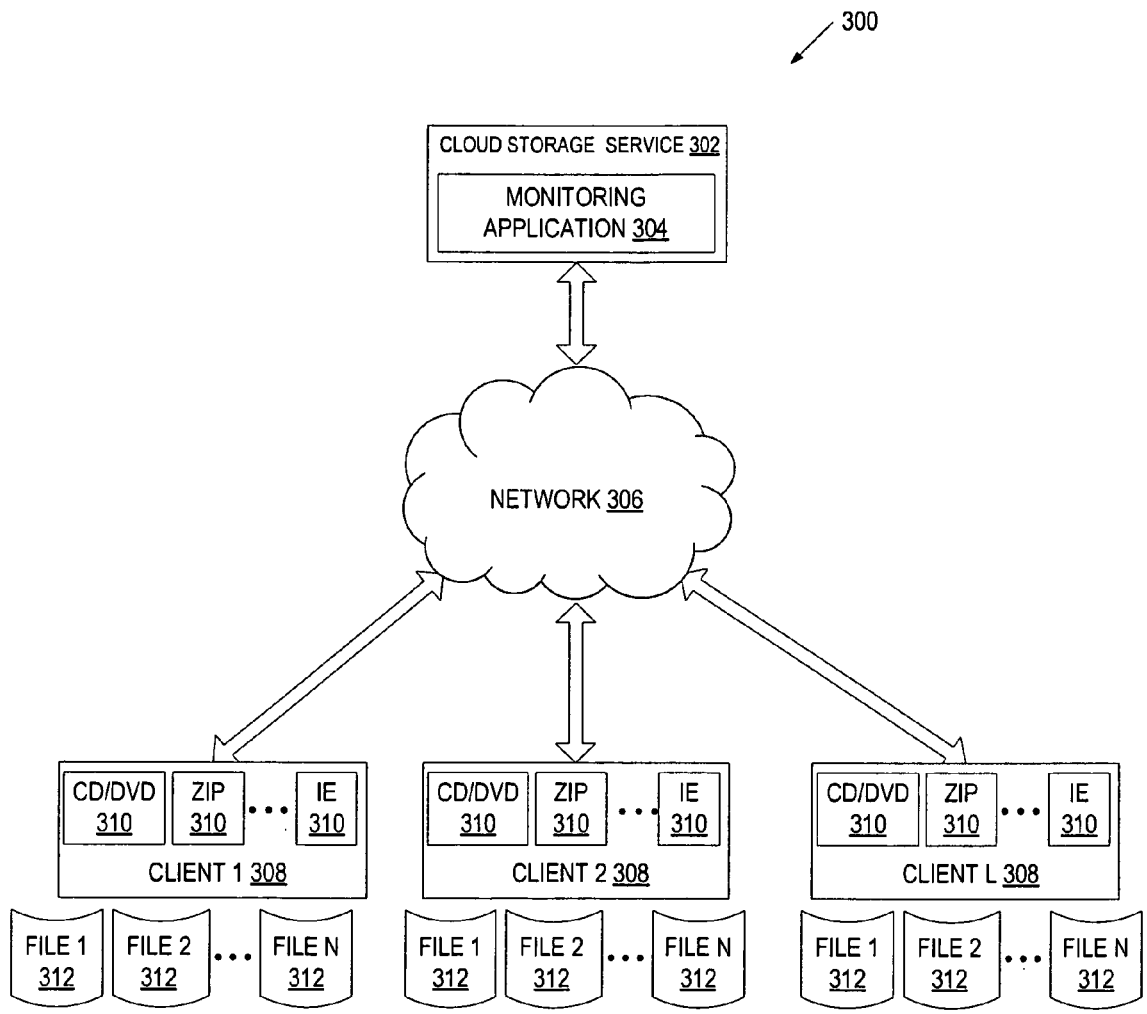

FIG. 3 illustrates another exemplary network architecture 300 in which embodiments of the invention may operate. According to network architecture 300, clients 308 are coupled to a cloud storage service device 302 via a network 210 (e.g., a private network such as LAN or a public network such as Internet). Each client 308 may be a PC, a laptop, a mobile phone, a personal digital assistant, etc. The cloud storage service 302 provides delivery of data storage to clients 308. In one embodiment, the cloud storage service 302 represents Microsoft® Live Mesh service that allows files 312 of clients 308 to be shared and synchronized. For example, when applications 310 of client 1 modify files 312 of client 1, the service 302 synchronizes files of client 2 and client 3 to match the files of client 1.

Applications 310 may modify data of files 312 or alternatively they can only modify metainfo of files 312. Monitoring application 304 monitors synchronization requests received from clients 308 and determines whether these requests affect only the file metainfo or the file data itself. As discussed above with reference to the monitoring application 106 of FIG. 1, the monitoring application 304 can make this determination based on read block sizes, read offsets, the number of synchronization requests per a time interval, or any combination of the above factors. If a request received from client 308 is limited to synchronization of file metainfo, the monitoring application 304 ignores this request, allowing it to proceed. Alternatively, if the client request involves transformation of file data, the monitoring application 304 triggers one or more actions such as scanning the file for confidential information and preventing the file data from being synchronized if the file contains confidential information.

Figure 4:
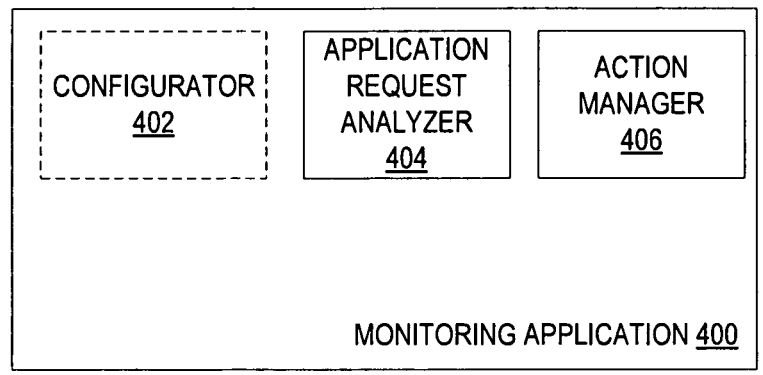
FIG. 4 is a block diagram of one embodiment of a monitoring application.

FIG. 4 is a block diagram of one embodiment of a monitoring application 400. The monitoring application 400 can optionally include a configurator 402 that can allow the monitoring application 400 to be configured (e.g., via a user interface) to monitor file access behavior of certain suspicious applications. In addition, the configurator 402 can configure the monitoring application 400 to use particular parameters for the analysis of the file access behavior of the suspicious applications. The parameters can be common for all suspicious applications or be specific to individual applications.

The monitoring application 400 may also include an application request analyzer 404 and an action manager 406. The application request analyzer 404 may monitor file access events associated with a suspicious application, and classify the behavior of the suspicious application based on the file access events.

The action manager 406 ignores file access events that indicate the application's intent to scan the metainfo of the file. When at least one of the application's file access events indicates its intent to manipulate the data of the file, the action manager 406 triggers one or more actions to be performed in response to such an event. For example, the action manager 406 may cause the file to be scanned for confidential information, and if the file contains confidential information, the application access to the file may be blocked or reported.

Figure 5:
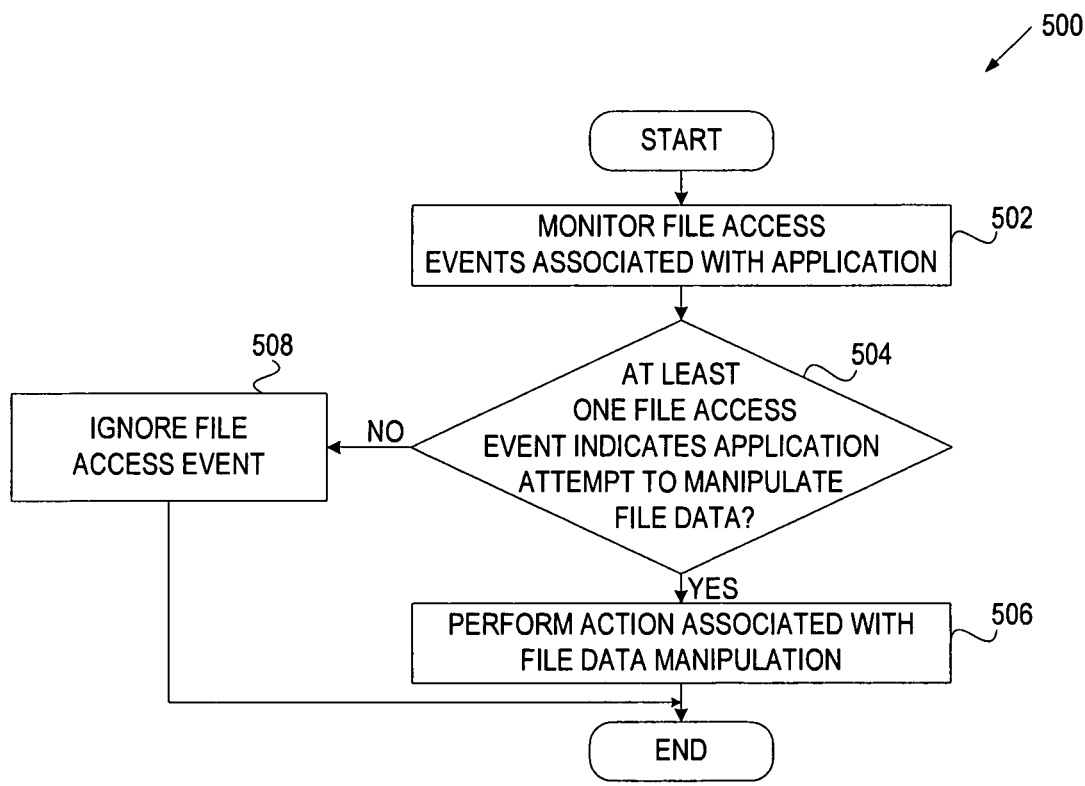
FIG. 5 is a flow diagram of one embodiment of a method for classifying an application behavior based on its data access pattern.

FIG. 5 is a flow diagram of one embodiment of a method 500 for classifying an application behavior based on its data access pattern. The method 500 is performed by processing logic that may comprise hardware (circuitry, dedicated logic, etc.), software (such as is run on a general purpose computer system or a dedicated machine), or a combination of both. The method 500 may be performed by a computing device such as a computing device 120 of FIG. 1, a server 202 of FIG. 2 or a cloud storage service device 302 of FIG. 3.

Referring to FIG. 5, processing logic begins with monitoring file access events associated with an application (block 502). An application may be, for example, a CD burning application, a DVD burning application, a compression application (e.g., zip compression), a browser (e.g., Internet Explorer®), a cloud storage application (e.g., Live Mesh service), etc. File access events may be received from a filter driver acting as part of the OS running in the computing device hosting the files accessed by the application, from a network-based application sniffing network traffic between a client and a data storage system hosting the files accessed by the client applications, or from any other module or application capable of obtaining information regarding file access requests of the application.

At block 504, processing logic determines whether at least one of these file access events indicates the application's attempt to manipulate data of the file. The determination may be based, for example, on read block sizes of the file access events, read offsets of the file access events, the number of file access events over a specific time interval, or any combination of the above factors. The file data manipulation, as opposed to metainfo data manipulation, may involve, for example, editing file data, transforming file data, writing file data to a removable storage medium, etc.

If at least one file access event indicates the application's attempt to manipulate the file data, processing logic performs an action associated with such manipulation (block 506). An exemplary action may involve scanning the file data for confidential information, and upon detecting confidential information, blocking the access to the file data by the application and/or reporting the application's access of the file data. Otherwise, if the file access events indicate the application's attempt to scan the file's metadata, as opposed to the file data, processing logic ignores the file access events (block 508).

In another embodiment, processing logic first determines which files contain confidential information, and then at block 504, it only considers those file access events that pertain to files containing confidential information. If processing logic determines that the application attempts to merely scan metinfo of a file containing confidential information, processing logic ignores the relevant file access event (block 508). Alternatively, if processing logic determines that the application attempts to read the file data, then processing logic triggers an action that may prevent, restrict or report this attempt of the suspicious application (block 506).

Figure 6:
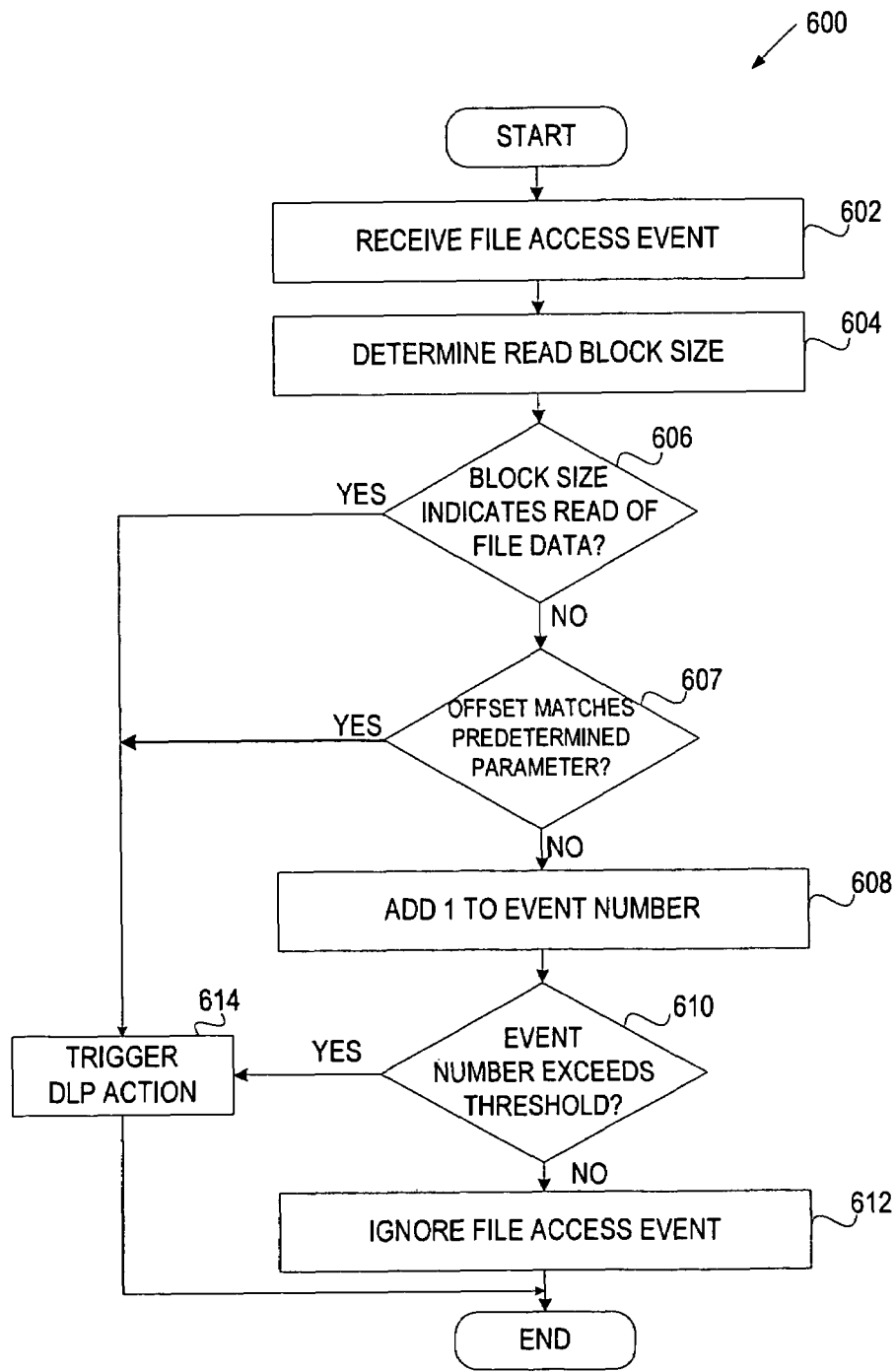
FIG. 6 is a flow diagram of one embodiment of a method for analyzing an application data access pattern.

FIG. 6 is a flow diagram of one embodiment of a method for analyzing an application data access pattern. The method 600 is performed by processing logic that may comprise hardware (circuitry, dedicated logic, etc.), software (such as is run on a general purpose computer system or a dedicated machine), or a combination of both. The method 600 may be performed by a computing device such as a computing device 120 of FIG. 1, a server 202 of FIG. 2 or a cloud storage service device 302 of FIG. 3.

Referring to FIG. 6, processing logic begins with receiving a file access event associated with an application (block 602). The file access event may identify an application, a file being accessed by the application, the read block size requested by the application, and optionally a read offset requested by the application. As discussed above, the file access event may be received from a filter driver acting as part of the OS running in the computing device hosting the files accessed by the application, from a network-based application sniffing traffic between a client and a data storage system hosting the files accessed by the client applications, or from any other module or application capable of obtaining information regarding file access requests of the application.

At block 604, processing logic determines the requested read block size by parsing information of the file access event. At block 606, processing logic determines whether the requested block size indicates a file data read pattern. If so, processing logic triggers one or more DLP actions (block 614). If not, processing logic may, in one embodiment, further verify that the file access event follows a metainfo read pattern by comparing a requested read offset with predetermined read offsets (block 607). If the requested read offset matches a predetermined read offset, processing logic proceeds to block 608. If not, processing logic triggers one or more DLP actions (block 614).

At block 608, processing logic increments the event number parameter. If the resulting event number parameter exceeds a threshold number (block 610), processing logic triggers one or more DLP actions (block 614). Alternatively, processing logic ignores the file access event (block 612).

Figure 7:
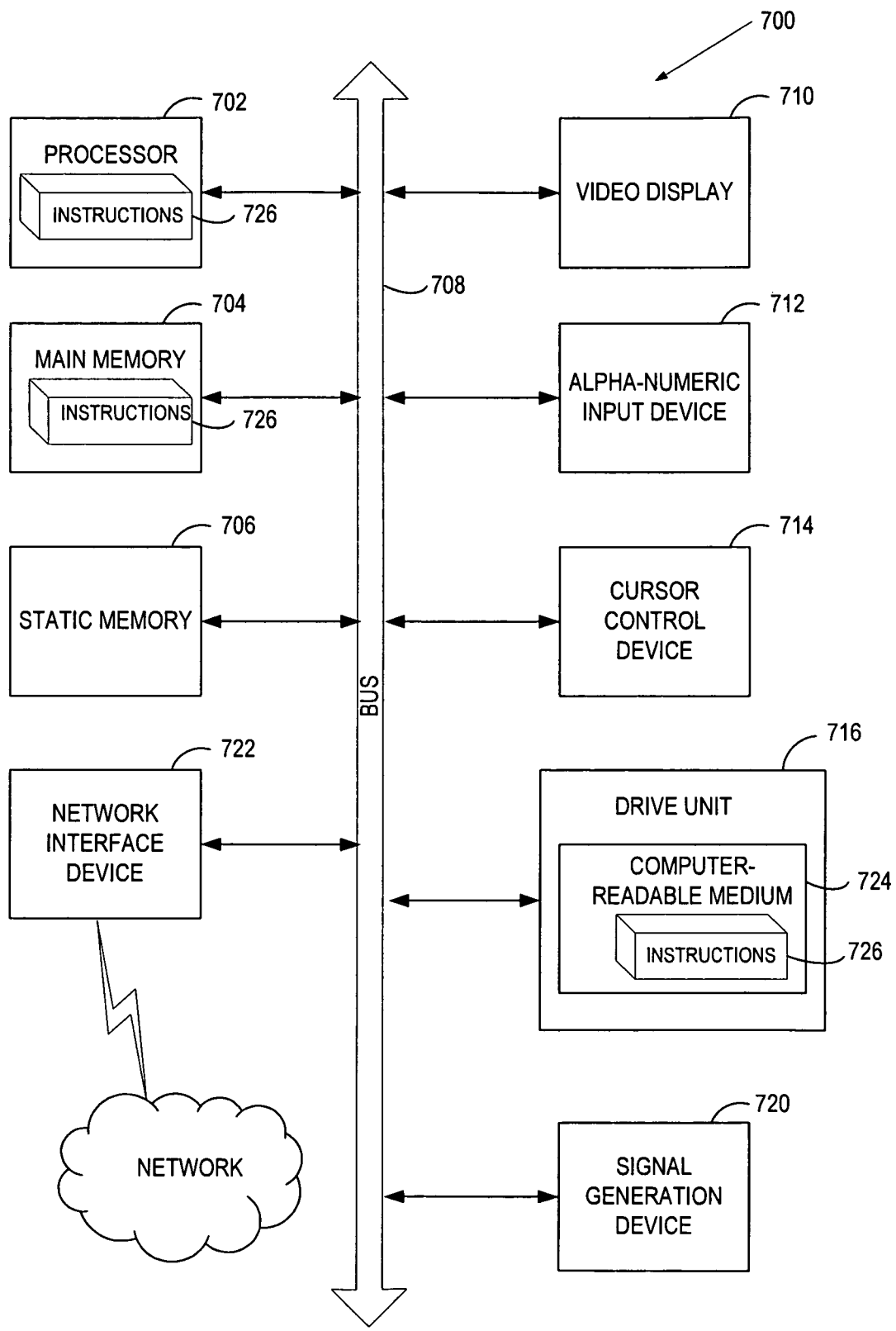
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute the processing logic 726 for performing the operations and steps discussed herein.

The computer system 700 may further include a network interface device 708. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-accessible storage medium 730 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-accessible storage media. The software 722 may further be transmitted or received over a network 720 via the network interface device 708.

While the machine-accessible storage medium 730 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A computer-implemented method comprising:
    monitoring, by a monitoring application of a computing device, file access events associated with a monitored application;
    detecting the occurrence of a file access event by the monitored application;
    identifying an iteration number of the file access event over a time interval, a read block size of the file access event, and a read offset of the file access event;
    classifying the file access event as a file data read pattern when at least one of the iteration number of the file access event over the time interval exceeds a threshold iteration number, the read block size exceeds a threshold block size, or the read offset exceeds a threshold read offset;
    classifying the file access event as a metadata read pattern when the iteration number of the file access event over the time interval is less than the threshold iteration number, the read block size is less than the threshold block size, and the read offset is less than the threshold read offset, wherein the iteration number is incremented when the read block size is less than the threshold block size and the read offset is less than the threshold read offset;
    when the file access event is classified as the file data read pattern, performing, by the monitoring application, at least one action to prevent loss of confidential data; and
    when the file access event is classified as the metadata read pattern, ignoring, by the monitoring application, the file access event at the monitoring application.

2. The method of claim 1 wherein the monitored application is any one of a compact disk (CD) burning application, a digital video disk (DVD) burning application, a data compression application, a browser application, and a cloud storage application.

3. The method of claim 1 further comprising:
    receiving the file access events from a filter driver or a network-based application sniffing network traffic.

4. The method of claim 1 wherein the file access event identifies the file and specifies the read block size.

5. The method of claim 4 wherein the file access event specifies the read offset.

6. The method of claim 1 wherein the file data read pattern comprises at least one of modifying the file data, copying the file data, and displaying the file data.

7. The method of claim 1 wherein the performing the at least one action further comprises:
    scanning the file data for confidential information; and
    upon detecting confidential information in the file, restricting the file read request.

8. The method of claim 1, wherein the file access event is classified as a metadata read pattern when the read offset of the file access event is the same as one or more offset parameters.

9. A system comprising:
    a memory;
    a processing device communicably coupled to the memory;
    an application request analyzer executable from the memory by the processing device, the application request analyzer configured to:
        monitor file access events associated with a monitored application;
        detect the occurrence of a file access event by the monitored application;
        identify an iteration number of the file access event over a time interval, a read block size of the file access event, and a read offset of the file access event;
        classify the file access event as a file data read pattern when at least one of the iteration number of the file access event over the time interval exceeds a threshold iteration number, the read block size exceeds a threshold block size, or the read offset exceeds a threshold read offset; and
        classify the file access event as a metadata read pattern when the iteration number of the file access event over the time interval is less than the threshold iteration number, the read block size is less than the threshold block size, and the read offset is less than the threshold read offset, wherein the iteration number is incremented when the read block size is less than the threshold block size and the read offset is less than the threshold read offset; and
    an action manager executable from the memory by the processing device and coupled to the application request analyzer, the action manager configured to:
        when the file access event is classified as the file data read pattern, perform at least one action to prevent loss of confidential data; and
        when the file access event is classified as the metadata read pattern, allow the file access event to proceed.

10. The system of claim 9 wherein the application is any one of a compact disk (CD) burning application, a digital video disk (DVD) burning application, a data compression application, a browser application, and a cloud storage application.

11. The system of claim 9 further comprising:
    a filter driver to generate the file access events.

12. The system of claim 9 wherein the file access event identifies the file and specifies the read block size and the read offset.

13. The system of claim 9, wherein the action manager to perform at least one action to prevent loss of confidential data in the file further comprises:
    scanning the file data for confidential information; and
    upon detecting confidential information in the file, restricting the file read request.

14. The system of claim 9, wherein the file access event is classified as a metadata read pattern when the read offset of the file access event is the same as one or more offset parameters.

15. A non-transitory computer readable storage medium that includes instructions, which when executed on a processing system, cause the processing system to perform operations comprising:
- monitoring, by a monitoring application executed by the processing device, file access events associated with a monitored application;
- detecting the occurrence of a file access event by the monitored application;
- identifying an iteration number of the file access event over a time interval, a read block size of the file access event, and a read offset of the file access event;
- classifying the file access event as a file data read pattern when at least one of the iteration number of the file access event over the time interval exceeds a threshold iteration number, the read block size exceeds a threshold block size, or the read offset exceeds a threshold read offset;
- classifying the file access event as a metadata read pattern when the iteration number of the file access event over the time interval is less than the threshold iteration number, the read block size is less than the threshold block size, and the read offset is less than the threshold read offset, wherein the iteration number is incremented when the read block size is less than the threshold block size and the read offset is less than the threshold read offset;
- when the file access event is classified as the file data read pattern, performing, by the monitoring application, at least one action to prevent loss of confidential data; and
- when the file access event is classified as the metadata read pattern, ignoring, by the monitoring application, the file access event at the monitoring application.

16. The non-transitory computer readable storage medium of claim 15 wherein the file access event identifies the file and specifies the read block size and the read offset.

17. The non-transitory computer readable storage medium of claim 15 wherein performing that at least one action further comprises:
- scanning the file data for confidential information; and
- upon detecting confidential information in the file, restricting the file read request.

18. The non-transitory computer readable storage medium of claim 15 wherein the file access event is classified as a metadata read pattern when the read offset of the file access event is the same as one or more offset parameters.

* * * * *